Sept. 9, 1969 H. T. WRIGHT 3,465,936

TAPE TENSIONING APPARATUS

Filed May 2, 1966 2 Sheets-Sheet 1

INVENTOR
HAROLD T. WRIGHT

BY Robert S. Clay

ATTORNEY

TAPE TENSIONING APPARATUS

Filed May 2, 1966 2 Sheets-Sheet 2

INVENTOR
HAROLD T. WRIGHT
BY Robert S. Clay
ATTORNEY

United States Patent Office 3,465,936

Patented Sept. 9, 1969

3,465,936

TAPE TENSIONING APPARATUS

Harold T. Wright, Belmont, Calif., assignor to Ampex Corporation, Redwood City, Calif., a corporation of California Filed May 2, 1966, Ser. No. 546,924
Int. Cl. B65h 23/18, 24/04; G03b 1/46
U.S. Cl. 226—39 3 Claims

ABSTRACT OF THE DISCLOSURE

To tension magnetic tape coming from a folded-storage bin and across transducing heads to a capstan, a drag idler and pinch roller is provided between the bin and heads. The drag idler is provided with a spring-tensioned brake band, which establishes the hold-back and tensioning force applied to the tape, and ensures that all frictional slippage takes place not between the tape and idler, where damage would result to the tape, but rather between the idler and the brake band. The tape between the idler and capstan is looped around a roller that is mounted at the end of a pivoted tension-sensing lever, which in turn is connected to the brake band so as to relieve the braking force when the tape tension exceeds a predetermined value. Thus the tape tension is automatically maintained precisely at this value.

This invention relates to magnetic tape transports and bin storage apparatus therefor, and particularly to apparatus for tensioning the tape coming from the bin.

In the magnetic tape transport art, it is a common expedient to store the tape loosely in a bin. Usually the tape is formed in an endless loop, and is drawn from the bin and across a magnetic head by a capstan and is then returned to the bin. Since the tape in the bin usually has no tension, some means must be provided to tension the tape coming from the bin so as to ensure that the tape remains in contact with the head in passage thereover. Drag means of various types have been used in the art, but these usually produce a drag of unvarying value, and are unsatisfactory when the outgoing loop of the tape in the bin becomes temporarily enmeshed with other loops, producing a transient drag in addition to that induced by the drag means. In such an event, the transient drag is added to the constant induced drag and a variation of tension in the tape at the head results.

It has been proposed to isolate the tape at the head by use of a "closed loop" apparatus, in which the tape coming from the drag means is engaged by the capstan, then passes in a loop around a "turnaround" idler and back to the opposite side of the capstan, with the head engaging the tape between the capstan and turnaround idler. However, even the combination of closed loop and drag means, as previously used in the art, fails to maintain a tension sufficiently constant for the most exacting recording and reproducing requirements.

Another problem associated with the use of rotating drag means to induce tension in a tape is that of preventing the drag means from skew driving the tape.

Accordingly, it is an object of the present invention to provide an apparatus for maintaining a constant predetermined tension in a segment of tape withdrawn from a bin, despite the variations in drag that may be induced in the tape inside the bin.

It is another object of the invention to provide an apparatus as above described and adapted for use either with or without a closed-loop configuration at the magnetic transducing head.

It is a further object of the invention to provide rotating drag means that will not skew-drive the tape.

These and other objects are satisfied in the present invention by a structure in which a drag idler and pinch roller assembly engages the tape as it comes from the bin, upstream from the capstan, and a spring-loaded band brake is coupled to the drag idler to provide a variable drag for the tape. A tension sensing arm engages the tape between the drag idler and capstan, and is coupled to the brake to decrease the braking force when the tension increases and to increase the braking force when the tension decreases. Thus if, for example, a transient drag occurs in the tape in the bin, tending to increase the tension, the brake is automatically relieved to the degree needed to maintain constant tension. In addition, the drag idler is crowned, and is made of a material having a higher coefficient of friction than the pinch roller, edge guiding flanges are provided, and the untensioned tape is guided between the flanges in a curved path to the point of engagement with the drag idler and pinch roller, so as to prevent skew driving of the tape.

A better understanding of the invention may be had by reference to the following description, taken in conjunction with the accompanying drawings, in which.

Figure 1:
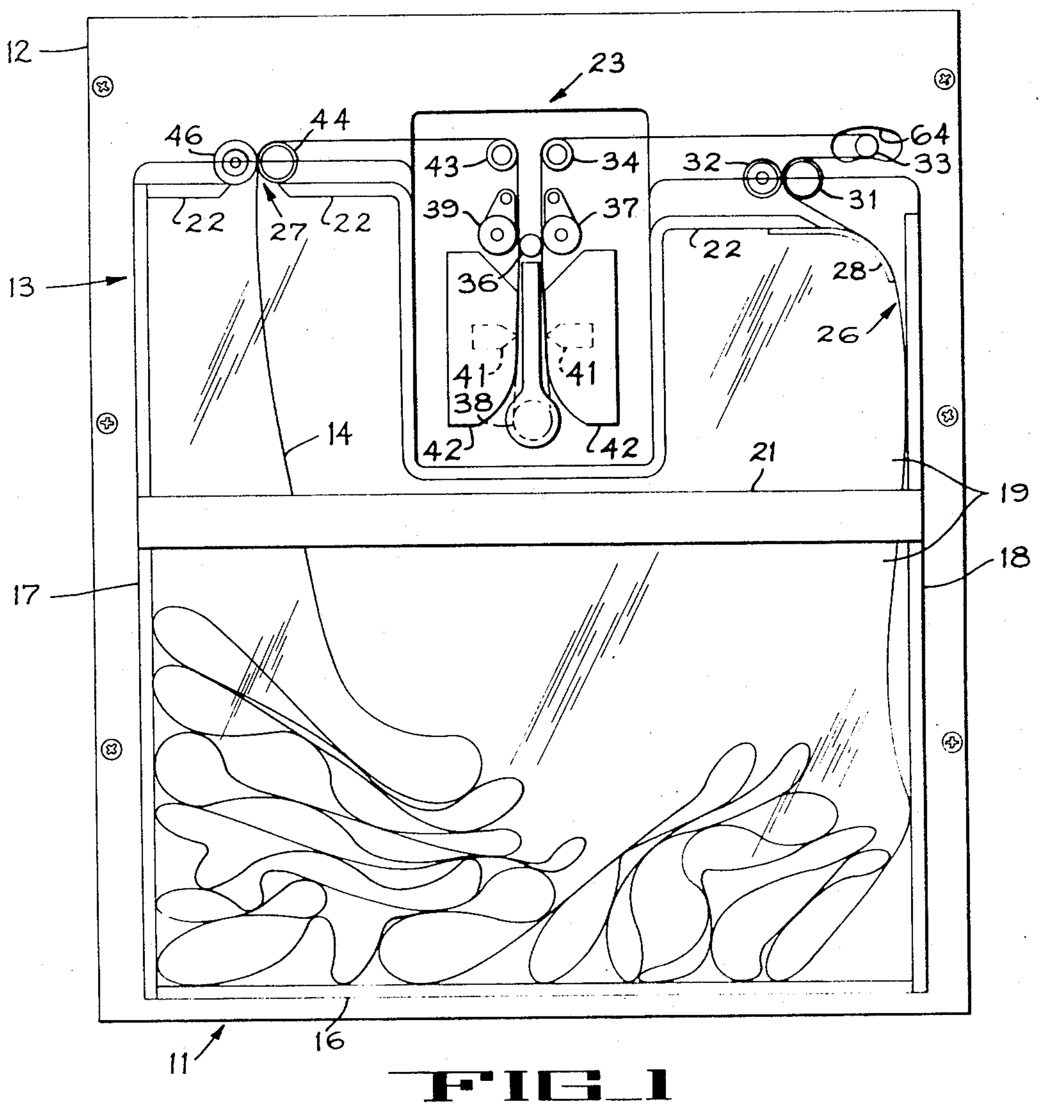
FIGURE 1 is a front elevation of a tape transport including the apparatus of the present invention.

Referring now to the drawings and particularly to FIGURE 1 thereof, there is shown a tape transport 11, having a top plate 12 on which is mounted a bin 13 for the storage of an endless loop of tape 14. The bin 13 includes a bottom wall 16, two side walls 17 and 18, and a transparent front wall 19, the upper portion of which is hinged by means of a hinge element 21, so that the bin can be opened for inserting or removing the tape. The bin also has an upper wall 22 formed to fit around a transport capstan and head assembly 23, and having formed therein an outlet port 26 and an inlet port 27 for withdrawing and returning the tape. The tape emerging from the bin passes a curved flange 28 adapted for preventing double loops of tape from emerging from the pin, and the tape thence passes between a drag idler 31 and associated pinch roller 32, around a tension arm idler 33, a fixed idler 34, and to the transport capstan 36. The pinch roller 32 may be retracted when not in use, by means known in the art and not here shown, to facilitate threading of the tape. The tape is pinched against the capstan 36 by a pinch roller 37 and thence passes in a closed loop around a turnaround idler 38 and back to the capstan 36 where it is again pinched by a pinch roller 39. A number of magnetic transducing heads 41 engage the tape in the loop and are covered by cover plates 42. From the pinch roller 39, the tape passes around another fixed idler 43 and to an auxiliary capstan 44 and pinch roller 46, which is driven by connecting means (not shown) from the main capstan 36 to drive the tape back into the bin through the inlet port 27. Alternatively, the auxiliary capstan 44 may be driven by a separate DC motor.

It will be understood that the pinch roller 37 need not be used to pinch the tape against the capstan 36, so long as the pinch roller 39 is in pinching engagement. In such case, the tape engaging the heads 41 would be arranged in a so-called "open loop."

It will be understood that no matter whether the pinch roller 37 is used or not, the drag idler 31 and associated pinch roller 32 tend to hold back the tape as it is pulled by the capstan 36, and therefore to tension the segment of tape that is in engagement with the heads 41. However, in the event that the tape in the bin catches up a number of the folded loops shown therein so as to be temporarily held back with a certain amount of drag induced in the bin itself, some means is desirable to prevent this increased drag from being reflected as an increase in the tension in the tape at heads 41.

Figure 2:
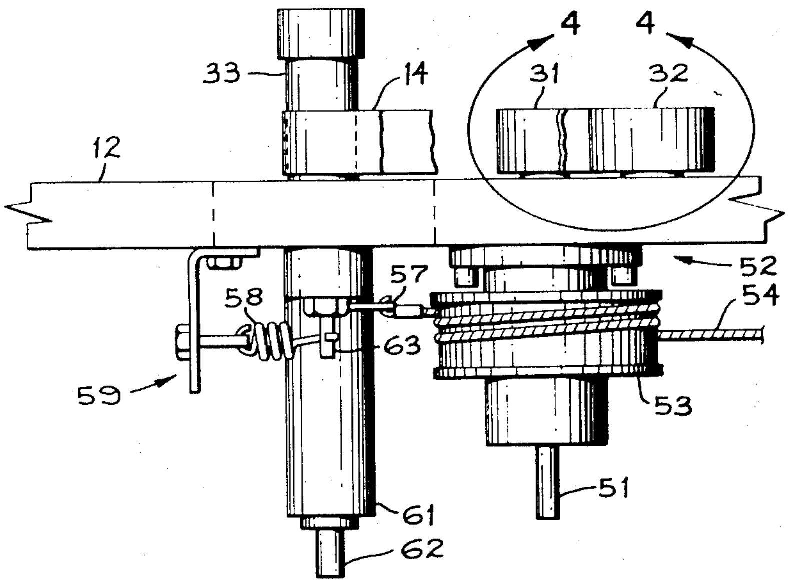
FIGURE 2 is a fragmented top plan view, to an enlarged scale, of the invention as shown in FIGURE 1.
Figure 3:
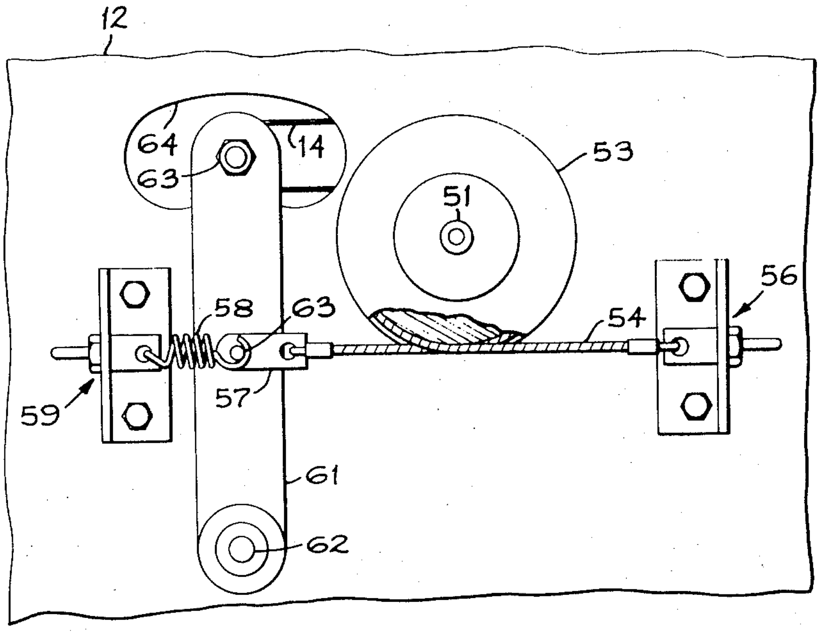
FIGURE 3 is a fragmented back elevation view, to the same scale as FIGURE 2.

Accordingly, as shown in FIGURES 2 and 3, the drag idler 31 is mounted on a shaft 51, which is journalled in a bearing assembly 52 that is attached to the rear side of the top plate 12. To the shaft 51 is attached a brake drum 53, around which is wrapped a brake band or string 54, which when tensioned provides the predetermined drag that is desired. One end of the band 54 is attached to a fixed mount 56 that is also mounted on the rear side of the top plate 12; and the other end of the brake band 54 is attached to a link 57 and tension spring 58, which is in turn fastened to a fixed mount 59 mounted on the rear side of the top plate 12.

In order to vary the drag as a function of the tension in the tape, a tension arm 61 is pivoted as by a pin 62 to the rear side of the top plate 12, and is attached to the link 57 between the spring and the brake band. The tension arm idler 33 is attached to the other end of the arm 61 as by a bolt 63, and projects through an arcuately shaped slot 64 to engage the tape 14 on the front side of the top plate 12.

In operation, the tension in the spring 58 and in the tape 14 come to a steady state balance, and the tension in the tape 14 may be established at a predetermined value as by adjusting the strength and the deformation of the spring 58. If any additional drag is induced by the intermingling of tape folds in the bin, the increased drag tends to increase the tension in tape 14, and the tension arm 61 responds by relieving the pull of the spring 58 on the brake band 54, so that the drag of the drag idler 31 is reduced. Similarly, when the transient drag disappears, the tension arm 61 responds to permit increased braking force to be exerted by the spring 58 and the drag of the idler 31 is increased. Thus the total drag felt by the tape is maintained at a constant value, and the tension in the tape at the heads 41 is also maintained constant.

Figure 4:
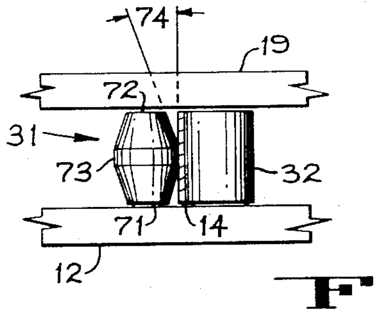
FIGURE 4 is a fragmented top plan view, to an enlarged scale, of the zone enclosed by lines 4—4 of FIGURE 2, but with the shape of some components exaggerated.

In order to prevent the drag idler 31 and pinch roller 32 combination from skew-driving the tape axially off the end of the idler, the idler 31 is crowned and is provided with a surface of higher coefficient of friction than the roller 32. In a preferred embodiment, shown in FIGURE 4, the roller 32 is made of metal and the surface portion of the idler 31 of rubber, having two oppositely converging conical surfaces 71, 72 with a cylindrical flat 73 between. The flat 73 is approximately $\frac{3}{16}$ inch wide, and the angle 74 of the conical surface is five degrees for half-inch tape, or 2½ degrees for quarter-inch tape. This angle 74 is shown in exaggerated degree in the figure, for clarity of illustration. In addition, the outlet port 26 and idler 31 are arranged so that the untensioned tape coming to the idler has a substantial angle of wrap around the idler before arriving at the pressure point of engagement with roller 32. Also the top plate 12 and front wall 19 of the transport and bin are spaced apart for a dimension only slightly greater than the width of the tape so as to define flanges, for edge guiding that portion of the untensioned tape that is moving in a curved path toward the roller 32. Thus the curved but untensioned tape is correctly guided by the edges substantially before it reaches the pinch zone, and tendencies of the tape edges to curl in contact with top plate 12 or wall 19 are frustrated in advance.

Thus there has been described a structure in which a drag idler and pinch roller assembly engages the tape as it comes from the bin, upstream from the capstan, and a spring-loaded band brake is coupled to the drag idler to provide a variable drag for the tape. A tension sensing arm engages the tape between the drag idler and capstan, and is coupled to the brake to decrease the braking force when the tension increases and to increase the braking force when the tension decreases. Thus if, for example, a transient drag occurs in the tape in the bin, tending to increase the tension, the brake is automatically relieved to the degree needed to maintain constant tension. In addition, the drag idler is crowned, and is made of a material having a higher coefficient of friction than the pinch roller, edge guiding flanges are provided, and the untensioned tape is guided between the flanges in a curved path to the point of engagement with the drag idler and pinch roller, so as to prevent skew driving of the tape.

What is claimed is:

1. In an endless tape transport of the type in which said tape is stored loosely in a bin, and is tensioned across a transducing element by means of a capstan and pinch roller assembly downstream therefrom and a drag idler and pinch roller assembly upstream therefrom, the improvement comprising:
   - variable-drag braking means coupled to said drag idler for controlling the tension in said tape at said transducing element, said braking means including a brake drum coupled to said drag idler; a brake band wrapped at least part way around said brake drum and secured at one end, the other end of said band being tensioned by a spring; tension sensing means engaging said tape between said drag idler and said capstan and coupled to said braking means for controlling the drag thereof so as to maintain said tension at a constant value;
   - said tension sensing means comprising a tension sensing arm pivoted at one end; and
   - an idler mounted on the other end of said arm and engaging said tape between said capstan and drag idler;
   - said arm being coupled to said other end of said band to decrease the braking force thereof when said tape tension increases and to increase said braking force when said tape tension decreases.

2. In an endless tape transport of the type in which said tape is stored loosely in a bin, and is tensioned across a transducing element by means of a capstan and pinch roller assembly downstream therefrom and a drag idler and pinch roller assembly upstream therefrom, the improvement comprising:
   - variable-drag braking means coupled to said drag idler for controlling the tension in said tape at said transducing element; and
   - tension sensing means engaging said tape between said drag idler and said capstan and coupled to said braking means for controlling the drag thereof so as to maintain said tension at a constant value;
   - said drag idler being crowned and having a higher coefficient of surface friction than said pinch roller;
   - said tape coming from said bin being guided in a substantial angle of wrap around said drag idler upstream from the point at which said pinch roller pinches said tape against said drag idler; and
   - a pair of edge guiding flanges being provided closely bracketing the edges of said tape within said angle of wrap.

3. The combination recited in claim 2, wherein said drag idler has a rubber surface portion and said pinch roller has a smooth metal surface portion.

References Cited

UNITED STATES PATENTS

| | | | |
|---|---|---|---|
| 2,115,737 | 5/1938 | Menschner | 226—44 X |
| 3,048,315 | 8/1962 | Pankratz | 226—118 |
| 3,237,831 | 3/1966 | Johnson | 226—195 X |
| 3,294,330 | 12/1966 | Whiteley | 226—184 X |

M. HENSON WOOD, Jr., Primary Examiner

R. A. SCHACHER, Assistant Examiner

U.S. Cl. X.R.

226—184, 44